United States Patent
Mestre et al.

(10) Patent No.: US 11,476,938 B2
(45) Date of Patent: Oct. 18, 2022

(54) BIDIRECTIONAL AND CONFIGURABLE DIRECTIONAL RAMAN PUMPING APPARATUS

(71) Applicant: Xieon Networks S.a.r.l., Senningerberg (LU)

(72) Inventors: Tiago Mestre, Idanha (PT); Carlo Marques, Lisbon (PT); Anton Schex, Germering (DE); Lutz Rapp, Deisenhofen (DE)

(73) Assignee: XIEON NETWORKS S.a.r.l., Luxembourg (LU)

( * ) Notice: Subject to any disclaimer, the term of this patent is extended or adjusted under 35 U.S.C. 154(b) by 735 days.

(21) Appl. No.: 16/081,594

(22) PCT Filed: Mar. 9, 2017

(86) PCT No.: PCT/EP2017/055533
§ 371 (c)(1),
(2) Date: Aug. 31, 2018

(87) PCT Pub. No.: WO2017/153517
PCT Pub. Date: Sep. 14, 2017

(65) Prior Publication Data
US 2019/0097726 A1    Mar. 28, 2019

(30) Foreign Application Priority Data
Mar. 9, 2016  (EP) .................................... 16159377

(51) Int. Cl.
*H04B 10/291* (2013.01)
*H01S 3/30* (2006.01)
(Continued)

(52) U.S. Cl.
CPC ..... *H04B 10/2916* (2013.01); *H01S 3/06754* (2013.01); *H01S 3/094011* (2013.01);
(Continued)

(58) Field of Classification Search
None
See application file for complete search history.

(56) References Cited

U.S. PATENT DOCUMENTS

| | | | |
|---|---|---|---|
| 6,556,342 B1 * | 4/2003 | Ellison | H01S 3/302 359/334 |
| 6,556,345 B1 * | 4/2003 | Gassner | H04B 10/0731 359/341.4 |

(Continued)

FOREIGN PATENT DOCUMENTS

| | | | | |
|---|---|---|---|---|
| EP | 1115185 A2 * | 7/2001 | | H01S 3/094011 |
| EP | 1 237 306 A1 | 9/2002 | | |

(Continued)

OTHER PUBLICATIONS

International Search Report and Written Opinion, PCT/EP2017/055533, dated May 18, 2017, 16 pages.

*Primary Examiner* — Eric L Bolda

(57) ABSTRACT

A Raman pumping device (10) for amplifying a data optical signal in a fiber optic transmission system, comprising first and second ports (12a, 12b) through which the data optical signal may respectively enter and exit the Raman pumping device (10), a Raman pump source (14) for generating a Raman pump signal, and at least one combiner (16) for combining the Raman pump signal with the data optical signal. The Raman pumping device (10) allows for selectively combining the Raman pump signal generated by the same Raman pump source (14), or at least parts of the same Raman pump source (14) codirectionally or counterdirectionally with the data optical signal.

22 Claims, 5 Drawing Sheets

(51) Int. Cl.
*H01S 3/067* (2006.01)
*H01S 3/094* (2006.01)
*H01S 3/0941* (2006.01)
*H01S 3/131* (2006.01)

(52) U.S. Cl.
CPC ............ *H01S 3/1312* (2013.01); *H01S 3/302* (2013.01); *H01S 3/0941* (2013.01); *H01S 3/09408* (2013.01)

(56) References Cited

U.S. PATENT DOCUMENTS

| | | | |
|---|---|---|---|
| 6,807,001 | B1 | 10/2004 | Ranka et al. |
| 2002/0024726 | A1* | 2/2002 | Hamada .............. H01S 3/13013 359/341.3 |
| 2003/0002143 | A1* | 1/2003 | Inoue .................. H01S 3/06754 359/341.3 |
| 2003/0142389 | A1* | 7/2003 | Gray ...................... H01S 3/302 359/334 |
| 2004/0196158 | A1* | 10/2004 | Sugaya .............. H04B 10/2916 340/815.4 |
| 2004/0212871 | A1 | 10/2004 | Hoshida et al. |
| 2005/0110980 | A1* | 5/2005 | Maehara .............. H04B 10/071 356/73.1 |

FOREIGN PATENT DOCUMENTS

| | | |
|---|---|---|
| EP | 1 246 378 A2 | 10/2002 |
| EP | 2 639 898 A1 | 9/2013 |
| WO | 00/49721 A2 | 8/2000 |
| WO | 2004/057712 A1 | 7/2004 |

* cited by examiner

BIDIRECTIONAL AND CONFIGURABLE DIRECTIONAL RAMAN PUMPING APPARATUS

This application is a 35 U.S.C. 371 national stage filing of International Application No. PCT/EP2017/055533, filed on Mar. 9, 2017, which claims priority to European Patent Application No. 16159377.7, filed on Mar. 9, 2016. The entire contents of these applications are incorporated herein by reference in their entirety.

FIELD OF THE INVENTION

The present invention is in the field of fiber optic communication. In particular, the present invention relates to a Raman amplifier for amplification of an optical signal in a fiber optic transmission system.

BACKGROUND OF THE INVENTION

The use of fiber-optic communication systems for transmitting information by sending light signals through an optical fiber is omnipresent in the telecommunications industry. Optical fibers are used to transmit various kinds of communication signals over long distances via a vast amount of—existing interurban and submarine transoceanic fiber communication lines.

In order to ensure the undisturbed detection of the communication signals after propagation over long distances, optical amplifiers are deployed along the optical transmission line in multiple locations to energetically boost the signal being transmitted. These optical amplifiers are at amplification locations which can be spaced hundreds of kilometers apart, typically between 50 km and 120 km, and may be placed on remote locations, possibly under the sea.

Optical amplifiers are preferred over electrical amplifiers or repeaters given the many technical advantages they offer, such as the elimination of the need for optical/electrical and electrical/optical conversion, or the ability of amplifying multichannel optical signals without having to demultiplex them. Further, besides increasing the amplitude of the optical signal, repeaters allow for alignment with respect to a clock signal and for restoration of the shape of the optical signal. However, repeaters are not transparent to the modulation format and data rate and hence have to be exchanged when replacing transponders by new ones using a different modulation format or higher data rate. In contrast, optical amplifiers are suitable for amplifying any kind of optical signal and for amplifying multiple optical signals simultaneously.

One possibility for optical amplification consists in exploiting the Raman gain induced by stimulated Raman scattering in a given medium. The Raman-active medium is often the optical fiber itself. In Raman amplification, a lower frequency "signal" photon induces the inelastic scattering of a higher frequency "pump" photon in the Raman-active medium. As a result of this inelastic scattering, another "signal" photon is produced, while the surplus energy is resonantly passed to the vibrational states of the medium. This process hence allows for an all-optical amplification. In "codirectional Raman amplification", the signal to be amplified and the pump light propagate in the same direction. Conversely, in "counterdirectional Raman amplification", the signal to be amplified and the pump light propagate in opposite directions.

Until recently, only counterdirectional Raman amplifiers have been used in multi-span long-haul optical transmission systems. However, the irruption of transponders supporting data rates beyond 40 Gbit/s and using higher-order modulation fat nats calls for optical transmission systems equipped with both codirectional and counterdirectional Raman amplifiers in order to provide the required optical signal-to-noise ratio.

Conventional Raman amplifiers are designed in a way that they can only be used in a fixed pumping direction, be it codirectional, counterdirectional or both. Hence different kinds of Raman amplifiers need to be kept in stock for deployment and maintenance tasks. Moreover, optical networks are currently evolving in a way that more flexibility in the use of the Raman amplifiers is increasingly required. In view of this, there is room for technical improvements regarding the polyvalence of Raman amplifiers.

U.S. Pat. No. 6,757,098 B2 describes a modular bidirectional optical amplification system consisting of building blocks or modules intended to operate in a modular manner exploiting the entire conventional erbium gain window as well as the extended erbium band. The different building blocks or modules can produce optical amplifier topologies which can either be unidirectional or bidirectional.

EP 1 250 737 B1 discloses a multi-stage Raman amplifier with bidirectional pumping and an improved noise figure. The multi-stage Raman amplifier consists of at least a first and a second pump, wherein the first pump produces a first, codirectional pump beam of a given Raman order and the second pump produces a second, counterdirectional pump beam of a different Raman order to that of the first pump. The multi-stage Raman amplifier can also comprise dual-wavelength Raman oscillators instead of the first and second pumps.

U.S. Pat. No. 7,110,680 B2 describes a method and system for codirectional Raman amplification in an optical communication system including a plurality of nodes coupled by an optical fiber. The optical fiber comprises a gain medium and is operable to transmit optical signals in a plurality of channels. Pump wavelengths and transmission channel bands are selected according to dispersion characteristics of the gain fiber for codirectional Raman pumping.

U.S. Pat. No. 6,738,180 B2 discloses an optical transmission system comprising a plurality of Raman amplifiers including a plurality of pump light sources of different pump wavelengths. The longitudinal section of the optical fiber where stimulated Raman scattering is generated differs depending upon the plurality of Raman amplifiers. The plurality of Raman amplifiers mutually compensates for the respective Raman gain wavelength properties.

SUMMARY OF THE INVENTION

The problem underlying the invention is to provide means and a method for decreasing the equipment requirements in the deployment and operation of a fiber optic transmission system.

This problem is solved by a Raman pumping device and a method for amplifying a data optical signal in a fiber optic transmission svstem, according to the respective claims.

The device of the invention comprises first and second ports through which the Raman pumping device may be connected to the fiber optic transmission system and a data optical signal may respectively enter and exit the Raman pumping device. Herein, the term "ports" is understood to have a broad meaning and covers any kind of optical interface allowing the transmission of the data optical signal through the Raman pumping device.

The Raman pumping device further comprises a Raman pump source for generating a Raman pump signal and at least one combiner for combining the Raman pump signal with the data optical signal. The Raman pump signal causes the data optical signal to be amplified by means of stimulated Raman scattering taking place in the fiber optic transmission system. The at least one combiner is typically a wavelength-division-multiplexer, preferably a four-port dual direction wavelength-division-multiplexer. However, the use of any other kind of combiner for combining optical signals is also possible. The Raman pump source may comprise any kind of light source suitable for its use in a fiber optic transmission system, like, but not restricted to, a laser light source.

According to the invention, the Raman pumping device allows for selectively combining the Raman pump signal generated by the same Raman pump source, or at least parts of the same Raman pump source, codirectionally or counterdirectionally with the data optical signal. This way, the Raman pumping device can be used either for codirectional or for counterdirectional amplification. This allows changing the pumping direction at a given injection point of a fiber optic transmission system in a simple way by simply modifying the operational mode of an already existing Raman pumping device, such that additional pumping devices need not be deployed for these purposes. Herein, "injection point" is understood as any part or section of a fiber optic transmission system at which an amplifying device may be installed such that the optical signal being transmitted in the fiber optic transmission system be combined at that part or section with a Raman pump signal, and hence Raman amplification subsequently take place in the fiber optic transmission system. Consequently, the number of devices employed for amplifying a data optical signal in a fiber optic transmission system can be reduced. Thereby, the cost for logistics and administration involved in the construction and operation of the fiber optic transmission system can be substantially reduced. Additionally, maintenance operators of the fiber optic transmission system need not keep samples of different amplifier types on stock, such that maintenance tasks are rendered simpler and less costly.

According to preferred embodiments of the invention, the Raman pumping device allows for selectively combining the Raman pump signal generated by the same Raman pump source, or at least parts of the same Raman pump source, codirectionally or counterdirectionally with the data optical signal, without disconnecting the Raman pumping device from the fiber optic transmission system. This way, there is no need to decide on the best suited pumping configuration during deployment of a fiber optic transmission system. This decision might instead be postponed to a later time, for example to the start of the operation of the fiber optical transmission system. In addition, the possibility is maintained of changing the pumping configuration during operation of the fiber optical transmission system without interrupting data traffic. Herein a "pumping configuration" is understood to stand for a given distribution of the Raman pump signal between codirectional and counterdirectional combination.

In a preferred embodiment of the invention, the Raman pumping device further allows for selectively combining a first part of the Raman pump signal codirectionally with the data optical signal and a second part of the Raman pump signal counterdirectionally with the data optical signal. This allows for amplification in the fiber optic transmission system to take place in both directions, that is, codirectionally and counterdirectionally.

Preferably, the power ratio of the first and second parts of the Raman pump signal is selectively adjustable. Counterdirectional Raman pumping provides suitable means to increase the optical signal-to-noise ratio in a fiber optic transmission system, while suffering from the possibility that too high signal power levels launched into the part of the fiber optical transmission system located downstream with respect to the propagation direction of the data optical signal from the pumping devices lead to increased non-linear effects. Codirectional Raman pumping is typically used to lower the impact of non-linear effects in a fiber optic transmission system without affecting the optical signal-to-noise ratio. Hence by selectively adjusting the power ratio of the first and second parts of the Raman pump signal, a power profile of the data optical signal may be optimized so as to provide an advantageous balance between optical signal-to-noise improvement and non-linear effects in the fiber optic transmission system.

According to a preferred embodiment of the invention, the Raman pumping device comprises an optical tunable splitter for selectively directing the Raman pump signal to one or both of a first combiner arranged to combine the Raman pump signal and the data optical signal codirectionally and a second combiner arranged to combine the Raman pump signal and the data optical signal counterdirectionally. The selective adjustment of the power ratio of the first and second parts of the Raman pump signal described above may then be carried out by operating the optical tunable splitter. This has the advantage of allowing the adjustment of the power ratio of codirectional and counterdirectional pumping by operation of the optical tunable splitter without having to access or modify the internal structure of the Raman pumping device. The selective adjustment may further be such that the Raman pump signal be completely combined codirectionally or counterdirectionally. Furthermore, the optical tunable splitter may be operated remotely, such that the power ratio of codirectional and counterdirectional pumping may be modified without physically handling the Raman pumping device or the network cabling connected thereto. In addition by selectively adjusting the pump powers of a single pump for codirectional and counterdirectional pumping, the need for additional costly Raman pumps for codirectional and counterdirectional pumping can be eliminated and hence the costs for a Raman amplifier with an optimized signal-to-noise ratio can be significantly reduced.

The Raman pumping device may alternatively comprise an optical switch for selectively directing the Raman pump signal to the first combiner or to the second combiner or for interrupting the transmission of the Raman pump signal to any of the first combiner or second combiner. This permits to selectively configure the Raman pumping device to work either as a codirectional amplifier or a counterdirectional amplifier and to deactivate the Raman pumping device or parts thereof. Additionally, the optical switch may be operated remotely, such that the amplifying direction may be modified and the Raman pumping device or parts thereof may be deactivated without physically handling the Raman pumping device or the network cabling connected thereto.

Preferably, the optical tunable splitter or the optical switch are configured to operate in a wavelength independent manner, such that the first and second parts of the Raman pump signal may comprise equal wavelengths.

In preferred embodiments of the invention, the optical tunable splitter or the optical switch and the Raman pump source may be comprised in an integrated device. This may result in a more simplified cabling inside the Raman pumping device, a more efficient provisioning of the pump power to the fiber optic transmission system, and a reduction of the space required for installation of the optical tunable splitter or the optical switch, and the Raman pump source inside the Raman pumping device.

According to a preferred embodiment of the invention, the Raman pumping device may further comprise a controlling unit, wherein the controlling unit is configured for controlling the operation of the optical tunable splitter or the optical switch, and of the Raman pump source. This allows, for example, for automatic operation of the optical tunable splitter or the optical switch, which may be based on information or parameters of the data optical signal. The operational mode of the Raman pumping device may then be optimized, like for example by selectively adjusting the power ratio of codirectional and counterdirectional pumping, without the need of real-time intervention of a human operator. Further configurations may also allow automatic switching between codirectional and counterdirectional pumping of individual Raman pumping devices or activation and deactivation thereof. The latter case may be advantageously exploited for laser safety purposes by implementing the interruption of amplification when the fiber optical transmission system is damaged or interrupted at any of its stages.

In preferred embodiments of the invention, the Raman pumping device further comprises a spectral filtering structure, wherein the spectral filtering structure is configured for directing at least part of the data optical signal to an analyzing unit, wherein the analyzing unit is part of or in communication with the controlling unit. The information or parameters of the data optical signal on which the controlling unit may base its operational functions might then be previously extracted by the spectral filtering structure and optimally prepared by the analyzing unit before reaching the controlling unit. This allows for extraction of a predefined band of the spectrum of the data optical signal by the spectral filtering structure, which band or spectrum may be composed of a number of sub-bands and may also include tilt and ripple information, as well as information about the data optical signal power and spectral distribution. Additionally, the preprocessing of the information or parameters of the data optical signal in the spectral filtering structure and/or the analyzing unit may comprise transformation of optical information into electrical information, such that this transformation need not be carried out by the controlling unit.

According to a preferred embodiment of the invention, the Raman pumping device is symmetrical to an extent that it allows for an installation in a fiber optic transmission system in a first and a second installation orientation, wherein in the first and second installation orientations, the roles of the first and second ports are interchanged. According to this embodiment, a Raman pumping device momentarily working for example as a codirectional pumping device at a given injection point of a fiber optic transmission system may be made to work as a counterdirectional pumping device at the same injection point of the fiber optic transmission system by simply modifying the way the Raman pumping device is connected to the fiber optic transmission system. This may imply simply manipulating the wiring or modifying the physical installation orientation of the Raman pumping device.

A further advantage is related to the possibility of having a reduced stock of a single kind of Raman pumping device for installation during deployment of a fiber optic transmission system. Since the Raman pumping device according to this embodiment of the invention may be used for codirectional or counterdirectional pumping, different configurations of the same kind of Raman pumping device may be chosen for the different injection points of the fiber optic transmission system being deployed according to particular requirements. This way construction and installation works can be both technically and logistically simplified.

In a preferred embodiment of the invention, the Raman pump source of the Raman pumping device comprises a fiber amplifier having a first end coupled with the first port and a second end coupled with the second port, an amplifier pump source for pumping a fiber amplifying signal into the fiber amplifier, and first and second seed light sources for providing seed light to be amplified by the fiber amplifier to thereby generate the Raman pump signal. The first and second seed light sources may be coupled to inject the corresponding seed light into the fiber amplifier in opposite directions. The coupling of the different signals may be carried out by means of any suitable coupling device, like a wavelength-division-multiplexer combiner. Preferably, the power of the seed light provided by the seed light sources is constant.

The energy for amplification in the fiber amplifier is provided by the amplifier pump source. The fiber amplifier is coupled with the first port and the second port of the Raman pumping device via its first and second ends. According to this embodiment, the data optical signal may be amplified by either codirectional or counterdirectional Raman pumping, depending on which seed light source is operated.

It is likewise possible to operate both seed light sources simultaneously for simultaneous codirectional and counterdirectional pumping. Note that this embodiment is an example in which "at least parts of the same Raman pump source" are used for codirectional and counterdirectional Raman pumping, the "same part" being the fiber amplifier with its corresponding amplifier pump source, which is typically much more expensive than the seed light sources.

The coupling might be such that the fiber amplifier is arranged in parallel to the main transmission line of the data optical transmission system, such that the data optical signal does not pass the fiber amplifier. Alternatively, the fiber amplifier may be coupled with the first port and second port in such a way that the data signal be transmitted between the first and second ports through the fiber amplifier. In this case, the fiber amplifier itself forms the aforementioned combiner for combining the Raman pump signal with the data optical signal. Preferably, only the seed light is amplified in the fiber amplifier by the fiber amplifying signal, while the data optical signal undergoes no significant amplification in the fiber amplifier. Alternatively, a cladding pump configuration may be used.

In a preferred embodiment of the invention, the amplifier pump provides light with a power at least 3 times higher, preferably at least 15 times higher than the light provided by the first or second seed light sources. For example, the amplifier pump may provide light with a power between 1 and 3 W, whereas the first and second seed light sources may provide light with a power between 200 and 300 mW. The amplifier may then be a high-power pump, while the seed light sources are conventional, less costly low-energy pumps. This contributes to a cost-effective configuration for a Raman pumping device for amplifying in both directions.

Preferably, the first and second seed light sources may provide light with different wavelengths. The operation wavelength of the coupling devices that couple the fiber amplifying signal and the seed light may then be conveniently chosen, such that no part of the seed light be directed away from the fiber optic transmission system. For example, seed light stemming from the first seed light source may be prevented from being directed to the second seed light source by the coupler that couples the seed light from the second light source to the fiber amplifier by configuring said coupler to simply let light with the wavelength corresponding to the first seed light source pass through. The coupler that couples the seed light from the first light source to the fiber amplifier may be configured in an analogous way in order that seed light from the second seed light source is not directed to the first seed light source. This way, a better efficiency of the amplifying device can be achieved.

Typically, the fiber amplifier comprises a doped fiber, which is preferably selected such that amplification only takes place in the wavelength range of the seed light and not in the wavelength range of the data optical signal. Preferably, a Thulium-doped fiber amplifier may be used.

According to a preferred embodiment of the invention, the Raman pumping device may further comprise a signal tap and a first extraction port, wherein the signal tap is configured for extracting at least part of the data optical signal and directing it to the first extraction port, wherein the first extraction port is configured for being connected to a further component, in particular with a photodetector or with a light source. Herein, an "extraction port" is understood to be a virtual connection point or a terminal suitable for coupling further equipment, typically a measurement device, a control device, or a light source, to the Raman pumping device.

Preferably, the signal tap may be an optical filter configured for extracting at least part of the data optical signal lying within a predefined wavelength range and directing it to the first extraction port. This allows directing part of the data optical signal to further equipment, for example for monitoring purposes regarding the spectrum or the power of the data optical signal.

The extracted part of the data optical signal may constitute an optical supervisory channel for the transmission of information or parameters of the data optical signal and/or laser safety information for implementing the interruption of amplification when the fiber optical transmission system is damaged or interrupted at any of its stages.

The Raman pumping device may further comprise a second extraction port, wherein the signal tap is configured for extracting at least part of the data optical signal and for directing the extracted part of the data optical signal to the first extraction port when the data optical signal propagates from the first port to the second port and for directing the extracted part of the data optical signal to the second extraction port when the data optical signal propagates from the second port to the first port, wherein the second extraction port is configured for being connected to a further component, in particular with a photodetector or with a light source.

Given that the Raman pumping device according to the invention may have different installation orientations and that the data optical signal propagates inside the Raman pumping device in different directions depending on the orientation of the Raman pumping device, this ensures the extraction of the at least part of the data optical signal to at least one of the first extraction port and the second extraction port irrespectively of the particular installation orientation of the Raman pumping device.

The signal tap may comprise an optical filter configured for extracting at least part of the data optical signal within a predefined wavelength range and directing it to one or both of the first and second extraction ports. This has the advantage of restricting the extracted part of the data optical signal to a given wavelength range. Advantageously, this may for example prevent the data optical signal from interfering with the information being transmitted in an optical supervisory channel.

The Raman pumping device may further comprise an extraction switch, wherein the extraction switch allows for selectively connecting one of the first and second extraction ports with a further component, in particular with a photodetector or with a light source. Alternatively, the Raman pumping device may further comprise an extraction combiner, wherein the extraction combiner is configured for connecting the first and second extraction ports with a further component, in particular with a photodetector or with a light source.

In this embodiment, there is no need to provide individual elements of equipment for each extraction port. A single element of equipment may be selectively connected to one of the first and the second extraction ports. For example, in a case where the data optical signal is transmitted in a particular direction, the signal tap may direct at least a part thereof to only one of the first and second extraction ports. In this case, the extraction switch or the extraction combiner may allow for directing the extracted part of the data optical signal to the element of equipment, no matter in which particular direction the data optical signal is transmitted. Then, if, for example, the installation orientation of the Raman pumping device, and hence the direction of transmission of data optical signal as well, is reversed, the extracted part of the data optical signal may continue to be directed to the element of equipment, if necessary by conveniently adjusting the extraction switch.

In a preferred embodiment of the invention, the Raman pumping device may further comprise a connection interface allowing for interchangeably connecting a photodetector or a light source with the Raman pumping device, such that the one of a photodetector and a light source can be connected with at least one of the first extraction port and the second extraction port. Preferably, said photodetectors and light sources may have the form of exchangeable pluggable modules. This has the advantage of allowing any further equipment attached to the first extraction port or the second extraction port to be replaced or interchanged according to a desired function for the Raman pumping device, without having to provide dedicated equipment for each functionality.

According to an embodiment of the invention, the Raman pumping device may further comprise an optical measuring device, a first connection node and/or a second connection node. The first connection node may be arranged upstream with respect to the propagation direction of the data optical signal from the at least one combiner and connected to the measuring device. The second connection node may, alternatively or additionally, be arranged downstream with respect to the propagation direction of the data optical signal from the at least one combiner and connected to the measuring device. The first and second connection nodes may also be respectively arranged before and after the first and second ports. This way, properties of the fiber optic transmission system may be measured at different points. In particular, properties of the segments of the fiber optic transmission system connected to the first and second ports of the Raman pumping device may be independently measured.

The Raman pumping device may further comprise a measuring switching device, wherein the measuring switching device is configured to selectively connect the measuring device to one of the first and second connection nodes. The measuring switching device is typically an optical switch allowing for selective measurement of information or parameters of the data optical signal at the positions of the fiber optic transmission system corresponding to the first connection node and the second connection node. This way, information about the data optical signal or the fiber optic transmission system at different positions may be obtained by the measuring device. Preferably, said information allows evaluating the quality of the transmission fibers connected to the Raman pumping device. Further, the measuring device and the switching device may be comprised in an integrated device, such that the space required for installation and cabling in relation thereto can be reduced.

Additionally, one or both of the first and second connection nods may comprise an optical filter. This way, information or parameters of the data optical signal reaching the measuring device can be restricted to a predefined wavelength range. One or both of the first and second connection nodes may further comprise a coupler or a splitter, preferably a wavelength independent coupler or splitter.

The measuring device may be any device suitable for the extraction and/or processing of information or parameters of the data optical signal. Preferably, the measuring device can be an optical time-domain reflectometer or an optical frequency-domain reflectometer.

A further aspect of the invention relates to a method for selectively amplifying a data optical signal in a fiber optic transmission system codirectionally or counterdirectionally with the Raman pump source according to any of the elucidated embodiments.

DESCRIPTION OF THE PREFERRED EMBODIMENTS

Figure 1:
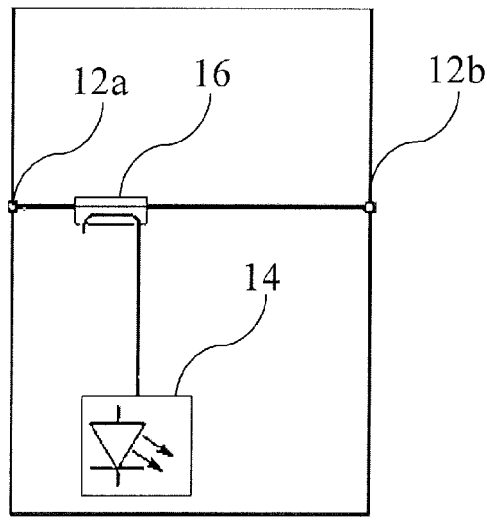
FIG. 1 shows a Raman pumping device according to embodiments of the invention.
Figure 1:
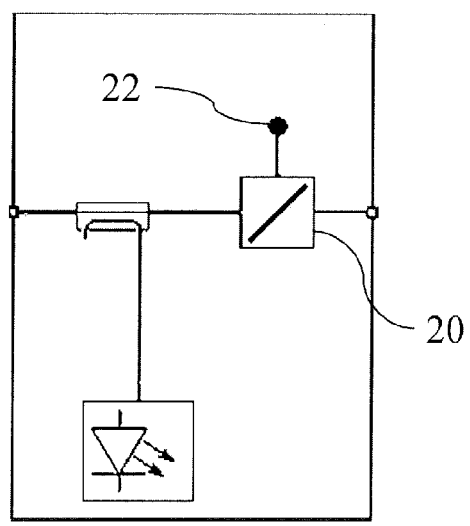
Figure 1:
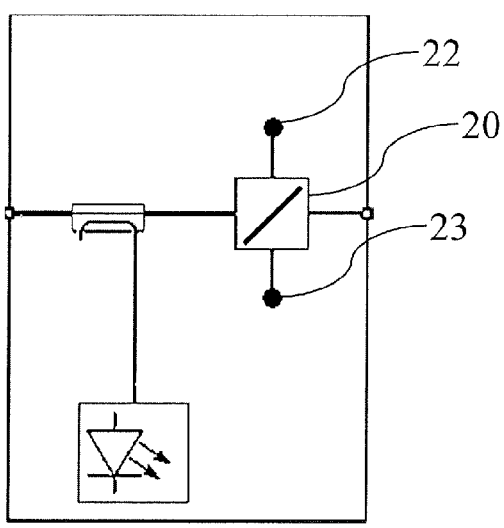
Figure 1:
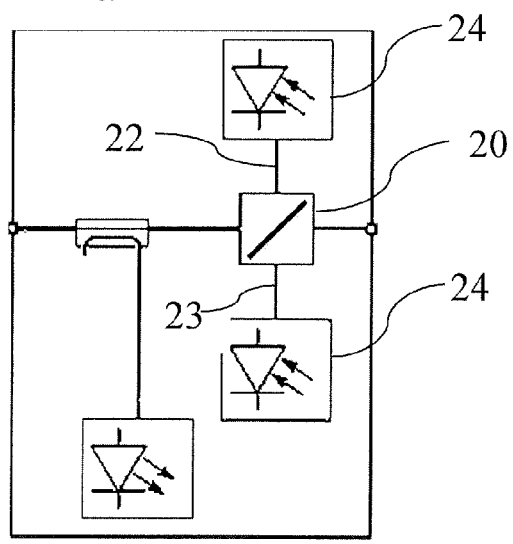

For the purposes of promoting an understanding of the principles of the invention, reference will now be made to a preferred embodiment illustrated in the drawings, and specific language will be used to describe the same. It will nevertheless be understood that no limitation of the scope of the invention is thereby intended, such alterations and further modifications in the illustrated apparatus and such further applications of the principles of the invention as illustrated therein being contemplated as would normally occur now or in the future to one skilled in the art to which the invention relates.

FIG. 1a shows a representation of a Raman pumping device 10 for amplifying a data optical signal in a fiber optic transmission system according to a preferred embodiment of the invention. The Raman pumping device 10 comprises first and second ports 12a, 12b through which the data optical signal may respectively enter and exit the Raman pumping device 10. The device 10 also comprises a Raman pump source 14 for generating a Raman pump signal and at least one combiner 16 for combining the Raman pump signal generated by the Raman pump source 14, or at least parts of the same, codirectionally or counterdirectionally with the data optical signal.

The Raman pump signal generated by the Raman pump source 14 is combined with the data optical signal by the combiner 16 such that the data optical signal is amplified in the fiber optic transmission system by means of Raman scattering. The Raman pumping device 10 can be installed in a fiber optic transmission system according to a first installation orientation such that the data optical signal is transmitted from the first port 12a to the second port 12b and the Raman pump signal is combined with the data optical signal by the combiner 16 counterdirectionally. According to a second installation orientation, resulting for example from a physical inversion of the Raman pumping device 10 with respect to the first installation orientation, the data optical signal is transmitted from the second port 12b to the second port 12a and the Raman pump signal is combined with the data optical signal by the combiner 16 codirectionally.

In the embodiment shown in FIG. 1b, the Raman pumping device 10 further comprises a signal tap 20 and a first extraction port 22. The signal tap 20 is an optical filter configured for extracting at least part of the data optical signal lying within a predefined wavelength range and directing it to the first extraction port 22.

Additionally, as shown in FIG. 1c, other preferred embodiments of the invention comprise a second extraction port 23. The signal tap 20 is configured for extracting at least part of the data optical signal and for directing the extracted part of the data optical signal to the first extraction port 22 when the data optical signal propagates from the first port 12a to the second port 12b. When the data optical signal propagates from the second port 12b to the first port 12a, the signal tap 20 directs the extracted part of the data optical signal to the second extraction port 23. The first and second extraction ports 22, 23 are configured as part of a connection interface for being interchangeably connected to further components, in particular with a photodetectors and/or a light source. An example of this is shown in FIG. 1d, where photodetectors 24 are connected to the first and second extraction ports 22, 23

The Raman pumping device 10 of FIG. 1 can also comprise an extraction switch or an extraction combiner (not shown in the figure, see FIG. 5) allowing the connection of the first and second extraction ports 22, 23 with a single further component of equipment 24, such that the extracted part of the data optical signal reaches said component of equipment 24 irrespectively of the propagation direction of the data optical signal. Furthermore, an optical isolator with switchable transmission direction as described in DE 196 532 76 A1 may be arranged between the ports 12a and 12b.

Figure 2:
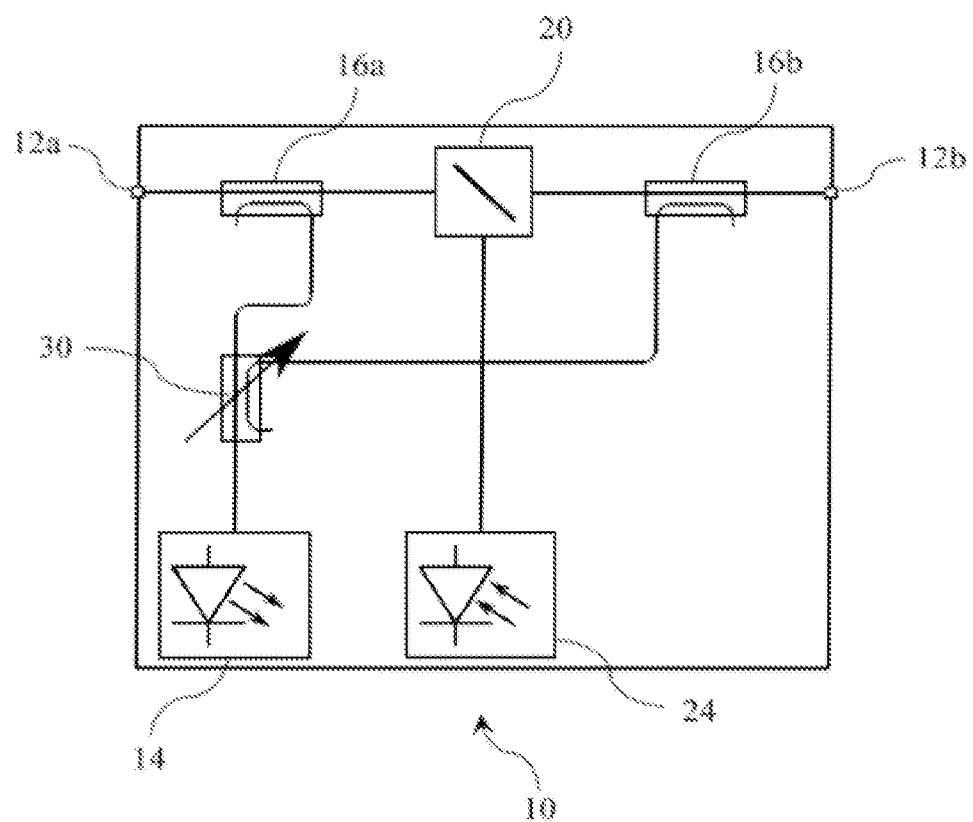
FIG. 2 shows a Raman pumping device according to an embodiment of the invention comprising an optical tunable splitter.

FIG. 2 shows another preferred embodiment of the Raman pumping device 10 comprising an optical tunable splitter 30, a first combiner 16a arranged to combine the Raman pump signal and the data optical signal counterdirectionally and a second combiner 16b arranged to combine the Raman pump signal and the data optical signal codirectionally. The Raman pumping device 10 of FIG. 2 allows for selectively combining a first part of the Raman pump signal generated by the Raman pump source 14 counterdirectionally with the data optical signal at the first combiner 16a. A second part of the Raman pump signal generated by the Raman pump source 14 is combined codirectionally with the data optical signal and the second combiner 16b. By operating the optical tunable splitter 30, the power ratio of the first and second parts of the Raman pump signal can be selectively adjusted. The optical tunable splitter 30 is wavelength independent, such that the first and second parts of the Raman pump signal comprise equal wavelengths. The device 10 also comprises a signal tap 20 for extracting at least part of the data optical signal and directing it to a further component 24, which in the example shown is a photodetector.

FIG. 3a shows a related embodiment of the Raman pumping device 10 of FIG. 2 in which the first and second combiners 16a, 16b are integrated in a single four-port combiner 16 which allows to combine the Raman pump signal and the data optical signal counterdirectionally and/or codirectionally. The device 10 comprises an optical switch 32, which allows for selectively combining the Raman pump signal generated by the Raman pump source 14 with the data optical signal codirectionally or counterdirectionally at the combiner 16. The optical switch 32 can also be switched to an OFF position, such that the Raman pump signal from the Raman pump source 14 is not transmitted to the combiner 16 and the device 10 is hence deactivated. Furthermore, as shown in FIG. 3b, a signal tap 20 for extracting at least part of the data optical signal and directing it to a further component 24, in the example shown a photodetector, may be incorporated in the device 10.

FIG. 4a shows a Raman pumping device 10 comprising a fiber amplifier 40, an amplifier pump source 42 for pumping a fiber amplifying signal into the fiber amplifier 40 and first and second seed light sources 44a, 44b for providing seed light to be amplified in the fiber amplifier 40 to thereby generate the Raman pump signal. The seed light generated by the seed light sources 44a, 44b is directed to the fiber amplifier 40 by corresponding combiners 48a, 48b. The fiber amplifying signal generated by the amplifier pump source 42 is directed to the fiber amplifier 40 by a combiner 46. The data optical signal, the seed light and the fiber amplifying signal are combined in the fiber amplifier 40.

The seed light sources 44a, 44b are low-power pumps providing light with a power of 200 mW only. The first seed light source 44a provides light with a wavelength of 1453 nm whereas the second seed light source 44b provides light with a wavelength of 1438 nm. The combiners 48a, 48b are wavelength-selective and are configured such that no seed light from one seed light source 44a, 44b is directed to of the other seed light source 44b, 44a, respectively. For example, the combiner 48a is configured such that seed light generated by the seed light source 44b and amplified by the fiber amplifier 40 is not directed to the seed light source 44a, but is just allowed to pass towards a first end 41b of the fiber amplifier 40. Similarly, the combiner 48b is configured such that the seed light generated by the seed light source 44a and amplified by the fiber amplifier 40 is not directed to the seed light source 44b, but is just allowed to pass towards a second end 41b of the fiber amplifier 40. The amplifier pump 42 is a high-power pump providing light with a power of 3 W and a wavelength of 1020 nm. Alternatively, the light provided by the seed light sources can comprise a combination of wavelengths around 800 nm (e.g. 798 nm) and around 1400 nm.

The fiber amplifier 40 comprises a thulium-doped fiber that enables amplification of the seed light generated by the seed light sources 44a, 44b in the fiber amplifier 40. The data optical signal, however, is not amplified in the fiber amplifier 40, due to its higher wavelength. Once it has been amplified in the fiber amplifier 40 by the fiber amplifying signal generated by the amplifier pump 42, the seed light generated by the seed light sources 44a and/or 44b constitutes the Raman pump signal which amplifies the data optical signal in the fiber optic transmission system by means of Raman scattering. Note that the "fiber amplifying signal" is likewise a pump signal for pumping the thulium-doped fiber, but is not referred to as a "pump signal" herein, such as not to be confused with the Raman pump signal.

Figure 4:
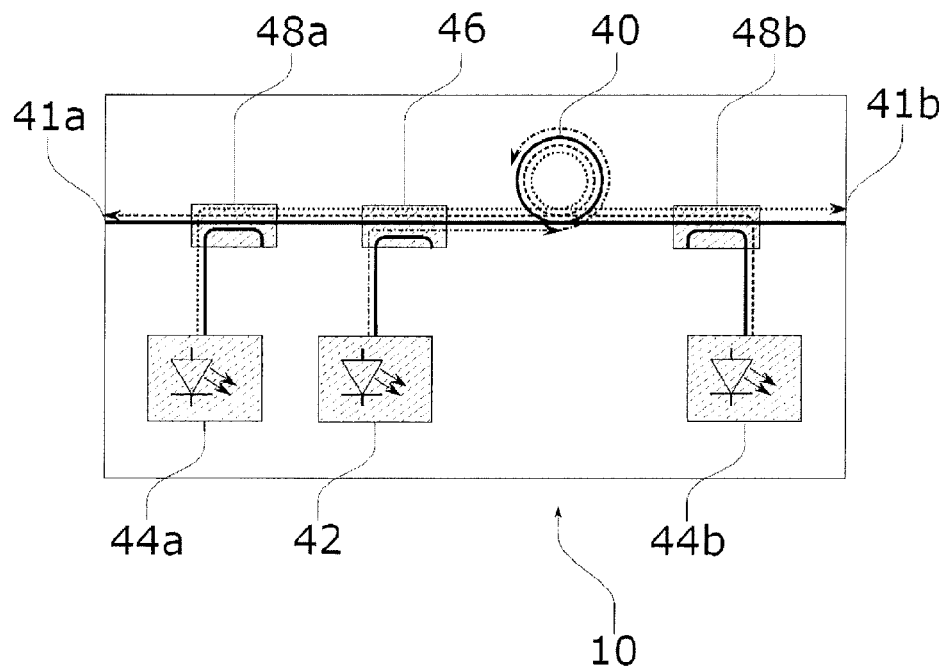
FIG. 4 shows a Raman pumping device according to an embodiment of the invention comprising a fiber amplifier.
Figure 4:
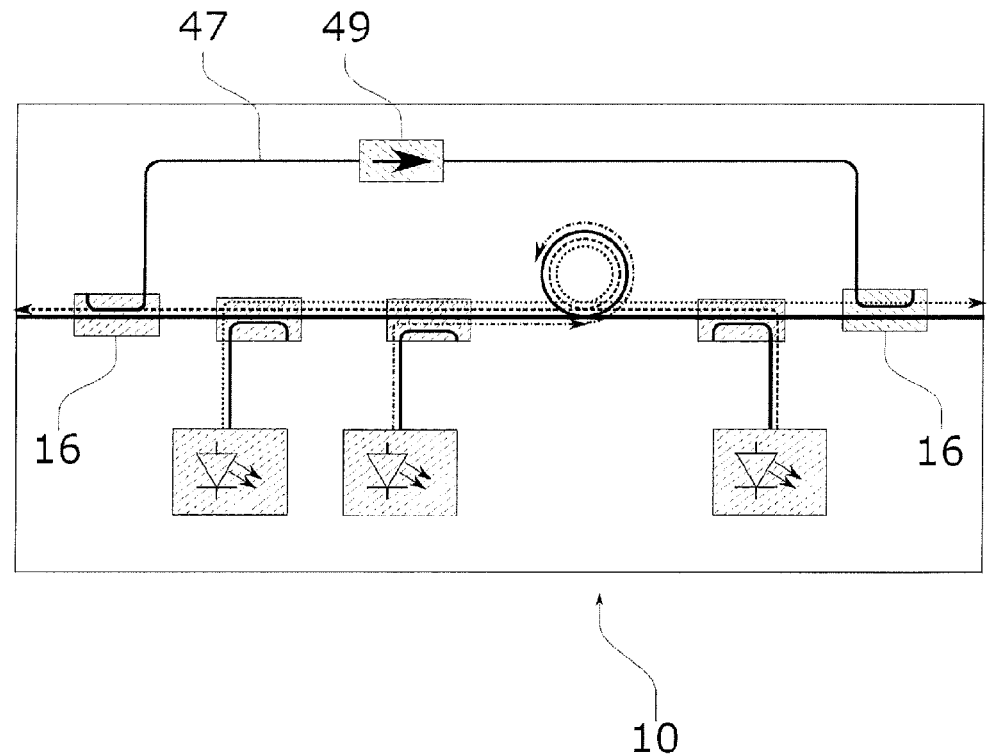

The seed light generated by the first seed light source 44a is injected into the fiber amplifier 40 in the direction from the first end 41a to the second end 41b of the fiber amplifier 40. The seed light generated by the second seed light source 44b is injected into the fiber amplifier 40 in the direction from the second end 41b to the first end 41a of the fiber amplifier 40, that is, in the opposite direction. While not shown in FIG. 4, the first end 41a of the fiber amplifier 40 is coupled to the first port 12a and the second end 41b is coupled to the second port 12b of the Raman pumping device 10. This coupling can be such that the data optical signal is transmitted through the fiber amplifier 40 itself or such that the data optical signal is transmitted through an additional fiber that would be arranged in parallel to the fiber of the fiber amplifier 40. An example of such an arrangement with an additional fiber 47 comprising an optional isolator 49 is shown in FIG. 4b. In any case, by selectively operating the seed light sources 44a, 44b, the data optical signal may be amplified codirectionally, counterdirectionally or in both directions. Furthermore, the power of the seed light sources 44a, 44b can be adjusted such that a desired power ratio between codirectional and counterdirectional amplification is given.

Figure 5:
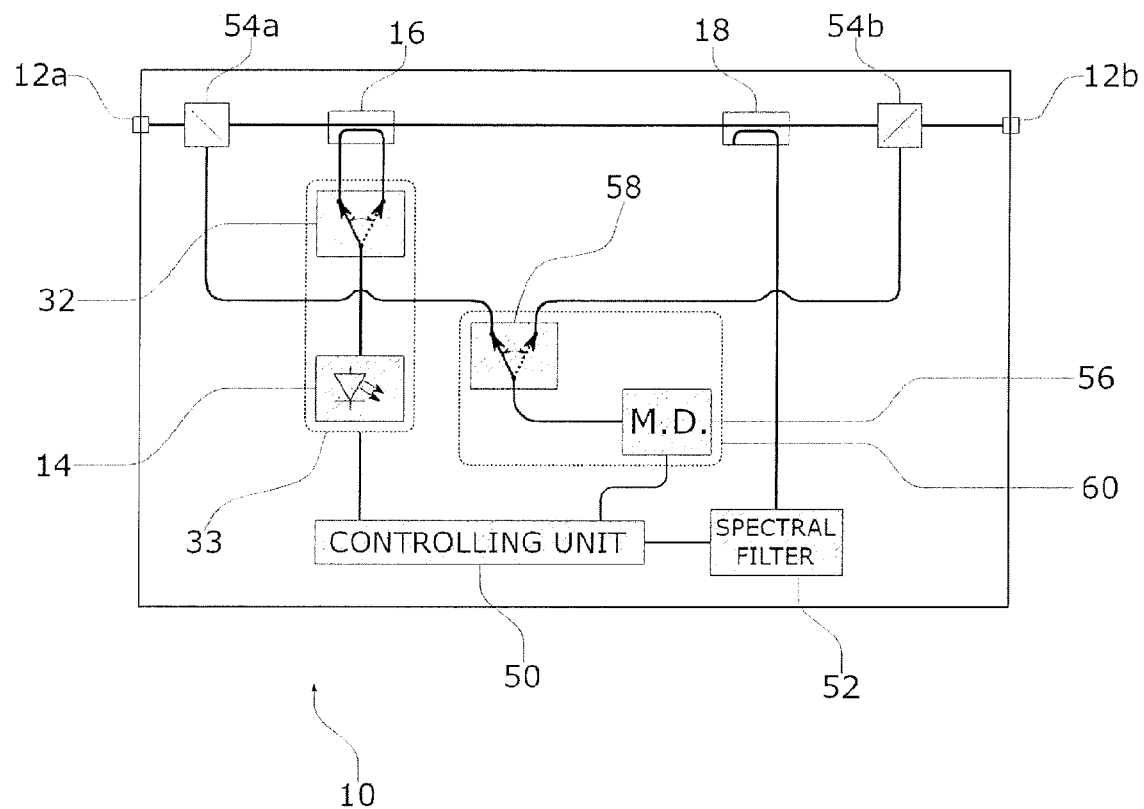
FIG. 5 shows a Raman pumping device according to an embodiment of the invention comprising an optical switch, a controlling unit, a spectral filtering, a measuring device and a measuring switching device.

FIG. 5 shows a Raman pumping device 10 of FIG. 3a in which the Raman pump source 14 and the optical switch 32 are comprised in an integrated device 33. The device 10 further comprises a wavelength independent splitter 18, a controlling unit 50 and a spectral filtering structure 52. The wavelength independent splitter 18 is configured for extracting at least part of the data optical signal and/or at least part of the Raman pump signal and directing it to the spectral filtering structure 52. The spectral filtering structure 52 is configured for receiving the part of the data optical signal and/or the part of the Raman pump signal extracted by the wavelength independent splitter 18 and for directing said extracted part of the data optical signal and/or of the Raman pump signal to an internal analyzing unit, which is in communication with the controlling unit 50, and which in the embodiment shown is comprised in the controlling unit 50. The controlling unit 50 is configured for controlling the operation of the optical switch 32 and of the Raman pump source 14.

The device 10 further comprises an optical measuring device 56, first and second connection nodes 54a, 54b and a measuring switching device 58. The measuring device 56 and the measuring switching device 58 are comprised in an integrated device 60. The first connection node 54a is arranged after the first port 12a, upstream with respect to the propagation direction of the data optical signal from the combiner 16 and selectively connectable to the measuring device 56 via the measuring switch 58. The second connection node 54b is arranged before the second port 12b, downstream with respect to the propagation direction of the data optical signal from the combiner 16 and selectively connectable to the measuring device 56 via the measuring switch 58. The measuring switching device 58 is configured to selectively connect the measuring device 56 to one of the first and second connection nodes 54a and 54b, such that the measuring device 56 can selectively and independently measure properties of the parts of the fiber optic transmission system connected to the connection nodes 54a and 54b.

The controlling unit 50 can then determine whether Raman pumping should take place or not, and if so, in which direction and with which power it should take place by adjusting the optical switch 32 and the Raman pump source 14. This is done based on the information provided by the measuring device 56 and the spectral filtering structure 52. Such information may comprise tilt/ripple information, laser safety supervision information, traffic channels measurement, information about the physical characteristics of the fiber, and information about the channel powers and their spectral distribution.

Figure 3:
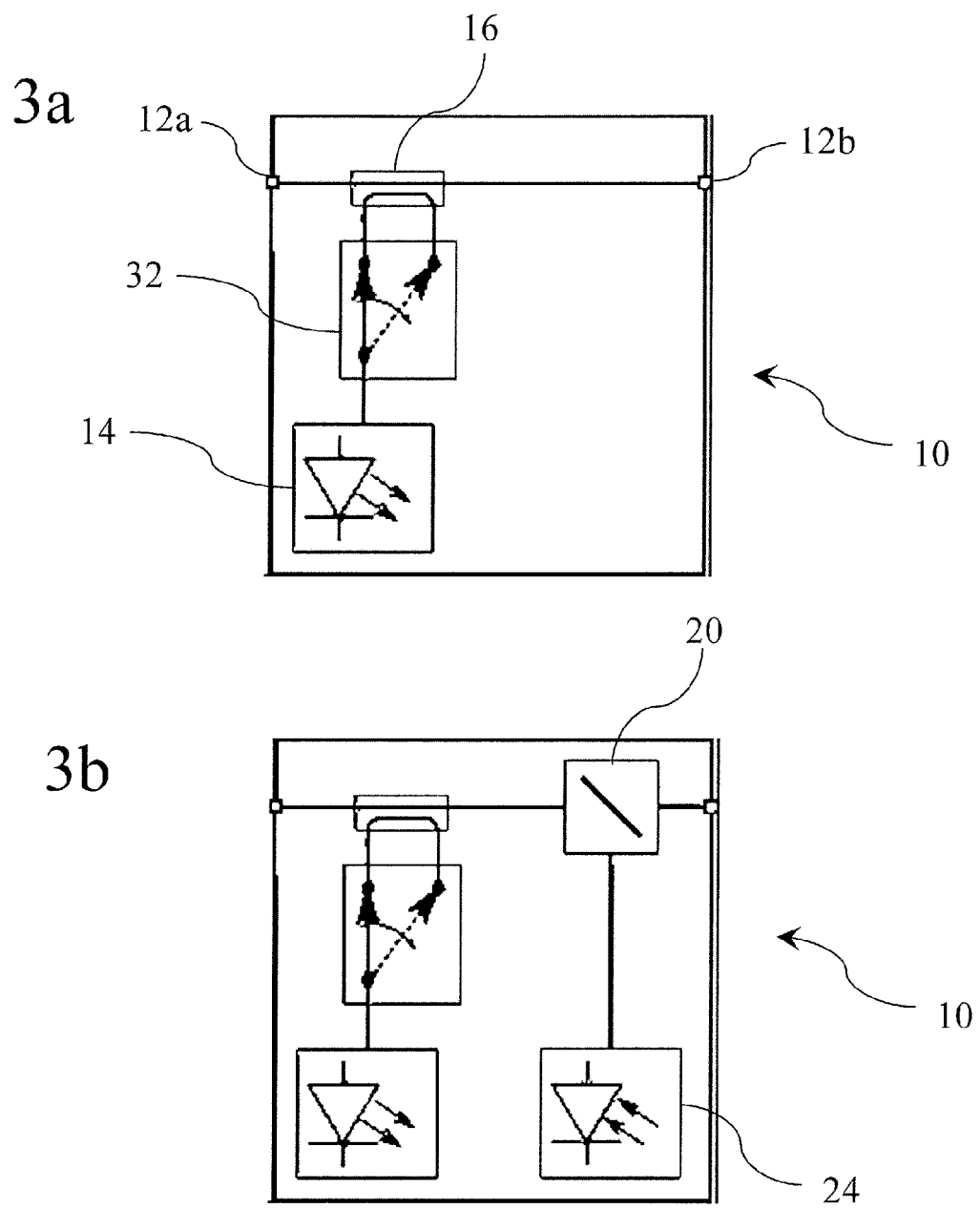
FIG. 3 shows a Raman pumping device according to an embodiment of the invention comprising an optical switch.

In FIGS. 2, 3, and 5, either an optical switch 32 or a tunable splitter 30 is shown. However, in all embodiments of the invention shown in these figures, the tunable splitter 30 can be substituted by an optical switch 32 and vice versa. Using an optical switch, the data optical signal can be selectively amplified either codirectionally or counterdirectionally, whereas a tunable splitter further allows to selectively amplify the data optical signal both codirectionally and counterdirectionally.

Although a preferred exemplary embodiment is shown and specified in detail in the drawings and the preceding specification, these should be viewed as purely exemplary and not as limiting the invention. It is noted in this regard that only the preferred exemplary embodiment is shown and specified, and all variations and modifications should be protected that presently or in the future lie within the scope of protection of the invention as defined in the claims.

LIST OF REFERENCE SIGNS

10 Raman pumping device
12a first port
12b second port
14 Raman pump source
16, 16a, 16b combiners
18 wavelength independent splitter
20 signal tap
22, 23 extraction ports
24, 26 component of equipment (e.g. photodetectors)
30 optical tunable splitter
32 optical switch
40 fiber amplifier
42 amplifier pump source
44a, 44b seed light sources
46, 48a, 48b combiners
50 controlling unit
52 spectral filter
54a, 54b connection nods
56 measuring device
58 switching device
60 integrated device

The invention claimed is:

1. A Raman pumping device for amplifying a data optical signal in a fiber optic transmission system, comprising:
   optical ports comprising a first optical port and a second optical port between which the Raman pumping device is configured to optically communicate and amplify the data optical signal;
   a Raman pump source for generating a Raman pump signal;
   a first component having a plurality of alternative states of operation comprising at least a first state of operation and an alternative second state of operation, the first component comprising at least one of an optical tunable splitter and an optical switch;
   at least one combiner configured to combine the Raman pump signal with the data optical signal to amplify the data optical signal;
   a controlling unit, wherein the controlling unit is configured to control the operation of the first component and the Raman pump source;
   wherein in the first state of operation, the Raman pumping device is configured to codirectionally combine the Raman pump signal and the data optical signal to amplify the data optical signal:
   wherein in the second state of operation, the Raman pumping device is configured to counterdirectionally combine the Raman pump signal and the data optical signal to amplify the data optical signal;
   wherein the Raman pumping device is configured to enable fiber optic transmission system installation of the Raman pumping device in at least two alternative installation configurations of the Raman pumping device such that:
     in a first installation configuration among the at least two alternative installation configurations, the Raman pumping device operates to communicate the data optical signal from the first optical port to the second optical port; and
     in a second installation configuration among the at least two alternative installation configurations, the Raman pumping device operates to instead communicate the data optical signal from the second optical port to the first optical port;
   wherein the first component also has a third state of operation among the plurality of alternative states of operation, and wherein in the third state of operation the Raman pumping device is further configured to selectively combine a first part of the Raman pump signal codirectionally with the data optical signal and a second part of the Raman pump signal counterdirectionally with the data optical signal;
   wherein the first component is further configured to selectively direct the Raman pump signal to both of:
     a first combiner arranged to combine the Raman pump signal and the data optical signal codirectionally; and
     a second combiner arranged to combine the Raman pump signal and the data optical signal counterdirectionally.

2. The Raman pumping device of claim 1, wherein the Raman pumping device is further configured to enable selective transitioning between the plurality of alternative states of operation without disconnecting the Raman pumping device from the fiber optic transmission system.

3. The Raman pumping device of claim 1, wherein a power ratio of the first and second parts of the Raman pump signal is selectively adjustable.

4. The Raman pumping device of claim 1, wherein the Raman pump source and the first component are comprised in an integrated device.

5. The Raman pumping device of claim 1, further comprising a spectral filtering structure, wherein the spectral filtering structure is configured to direct at least part of the data optical signal to an analyzing unit, wherein the analyzing unit is configured to provide input to the controlling unit.

6. The Raman pumping device of claim 1, further comprising:
   an optical measuring device; and
   at least one of:

a first connection node coupled to the measuring device and located upstream from the at least one combiner relative to a propagation direction of the data optical signal;

a second connection node coupled to the measuring device and located downstream from the at least one combiner relative to a propagation direction of the data optical signal.

7. The Raman pumping device of claim 6, further comprising a measuring switching device configured to selectively connect the measuring device to at least one of the first and second connection nodes.

8. The Raman pumping device of claim 7, wherein the measuring device and the measuring switching device are comprised in an integrated device.

9. The Raman pumping device of claim 6, wherein at least one of the first connection node and the second connection node comprises an optical filter.

10. The Raman pumping device of claim 9, wherein the measuring device comprises an optical time-domain reflectometer.

11. The Raman pumping device of claim 6, wherein the measuring device comprises an optical frequency-domain reflectometer.

12. A method for selectively amplifying a data optical signal in a fiber optic transmission system, comprising the steps of:

optically communicating the data optical signal; and amplifying the data optical signal using a Raman pump device, the Raman pumping device comprising:

optical ports comprising a first optical port and a second optical port between which the Raman pumping device is configured to optically communicate and amplify the data optical signal;

a Raman pump source for generating a Raman pump signal;

a first component having a plurality of alternative states of operation comprising at least a first state of operation and an alternative second state of operation, the first component comprising at least one of an optical tunable splitter and an optical switch;

at least one combiner configured to combine the Raman pump signal with the data optical signal to amplify the data optical signal;

a controlling unit, wherein the controlling unit is configured to control the operation of the first component and the Raman pump source;

wherein in the first state of operation, the Raman pumping device is configured to codirectionally combine the Raman pump signal and the data optical signal to amplify the data optical signal;

wherein in the second state of operation, the Raman pumping device is configured to counterdirectionally combine the Raman pump signal and the data optical signal to amplify the data optical signal;

wherein the Raman pumping device is configured to enable fiber optic transmission system installation of the Raman pumping device in at least two alternative installation configurations of the Raman pumping device such that:

in a first installation configuration among the at least two alternative installation configurations, the Raman pumping device operates to communicate the data optical signal from the first optical port to the second optical port; and in a second installation configuration among the at least two alternative installation configurations, the Raman pumping device operates to instead communicate the data optical signal from the second optical port to the first optical port;

wherein the first component also has a third state of operation among the plurality of alternative states of operation, and wherein in the third state of operation the Raman pumping device is further configured to selectively combine a first part of the Raman pump signal codirectionally with the data optical signal and a second part of the Raman pump signal counterdirectionally with the data optical signal;

wherein the first component is further configured to selectively direct the Raman pump signal to both of:

a first combiner arranged to combine the Raman pump signal and the data optical signal codirectionally; and a second combiner arranged to combine the Raman pump signal and the data optical signal counterdirectionally.

13. The method for selectively amplifying a data optical signal in a fiber optic transmission system of claim 12, wherein the Raman pumping device is further configured to enable selective transitioning between the plurality of alternative states of operation without disconnecting the Raman pumping device from the fiber optic transmission system.

14. The method for selectively amplifying a data optical signal in a fiber optic transmission system of claim 12, wherein a power ratio of the first and second parts of the Raman pump signal is selectively adjustable.

15. The method for selectively amplifying a data optical signal in a fiber optic transmission system of claim 12, wherein the Raman pump source and the first component are comprised in an integrated device.

16. The method for selectively amplifying a data optical signal in a fiber optic transmission system of claim 12, wherein the Raman pumping device further comprises a spectral filtering structure, the spectral filtering structure configured to direct at least part of the data optical signal to an analyzing unit that is configured to provide input to the controlling unit.

17. A Raman pumping device for amplifying a data optical signal in a fiber optic transmission system, comprising:

optical ports comprising a first optical port and a second optical port between which the Raman pumping device is configured to optically communicate and amplify the data optical signal;

a Raman pump source for generating a Raman pump signal;

a first component having a plurality of alternative states of operation comprising at least a first state of operation and an alternative second state of operation, the first component comprising at least one of an optical tunable splitter and an optical switch;

at least one combiner configured to combine the Raman pump signal with the data optical signal to amplify the data optical signal;

wherein in the first state of operation, the Raman pumping device is configured to codirectionally combine the Raman pump signal and the data optical signal to amplify the data optical signal;

wherein in the second state of operation, the Raman pumping device is configured to counterdirectionally combine the Raman pump signal and the data optical signal to amplify the data optical signal;

wherein the Raman pumping device is configured to enable fiber optic transmission system installation of the Raman pumping device in at least two alternative installation configurations of the Raman pumping device such that:
- in a first installation configuration among the at least two alternative installation configurations, the Raman pumping device operates to communicate the data optical signal from the first optical port to the second optical port; and
- in a second installation configuration among the at least two alternative installation configurations, the Raman pumping device operates to instead communicate the data optical signal from the second optical port to the first optical port;

wherein the first component also has a third state of operation among the plurality of alternative states of operation, and wherein in the third state of operation the Raman pumping device is further configured to selectively combine a first part of the Raman pump signal codirectionally with the data optical signal and a second part of the Raman pump signal counterdirectionally with the data optical signal;

wherein the first component is further configured to selectively direct the Raman pump signal to both of:
- a first combiner arranged to combine the Raman pump signal and the data optical signal codirectionally; and
- a second combiner arranged to combine the Raman pump signal and the data optical signal counterdirectionally;

wherein the first and second combiners are integrated in a four-port combiner having first and second ports respectively arranged to combine the Raman pump signal and the data optical signal codirectionally and counterdirectionally.

18. A Raman pumping device for amplifying a data optical signal in a fiber optic transmission system, comprising:
- optical ports comprising a first optical port and a second optical port between which the Raman pumping device is configured to optically communicate and amplify the data optical signal;
- a Raman pump source for generating a Raman pump signal;
- a first component having a plurality of alternative states of operation comprising at least a first state of operation and an alternative second state of operation, the first component comprising at least one of an optical tunable splitter and an optical switch;
- at least one combiner configured to combine the Raman pump signal with the data optical signal to amplify the data optical signal;
- a first extraction port;
- a second extraction port;
- a signal tap configured to:
  - extract at least a first part of the data optical signal that the Raman pumping device is configured to direct to the first extraction port; and
  - extract at least a second part of the data optical signal that the Raman pumping device is further configured to:
    - direct to the first extraction port in an installation where the data optical signal propagates from the first optical port to the second optical port; and
    - direct to the second extraction port in an installation where the data optical signal propagates from the second optical port to the first optical port, wherein the second extraction port is configured to be optically coupled to a second component comprising at least one of a photodetector and a light source;

wherein in the first state of operation, the Raman pumping device is configured to codirectionally combine the Raman pump signal and the data optical signal to amplify the data optical signal;

wherein in the second state of operation, the Raman pumping device is configured to counterdirectionally combine the Raman pump signal and the data optical signal to amplify the data optical signal;

wherein the Raman pumping device is configured to enable fiber optic transmission system installation of the Raman pumping device in at least two alternative installation configurations of the Raman pumping device such that:
- in a first installation configuration among the at least two alternative installation configurations, the Raman pumping device operates to communicate the data optical signal from the first optical port to the second optical port; and
- in a second installation configuration among the at least two alternative installation configurations, the Raman pumping device operates to instead communicate the data optical signal from the second optical port to the first optical port.

19. The Raman pumping device of claim 18, wherein the signal tap comprises an optical filter configured to extract at least part of the data optical signal lying within a predefined wavelength range.

20. The Raman pumping device of claim 18, further comprising an extraction switch configured to enable selective coupling of at least one of the first extraction port and the second extraction port with the second component.

21. The Raman pumping device of claim 18, further comprising an extraction combiner.

22. The Raman pumping device of claim 18, further comprising a connection interface configured to enable at least one of the first extraction port and second extraction port to be interchangeably and alternatively optical coupled to each of a photodetector and a light source.

* * * * *